UNITED STATES PATENT OFFICE.

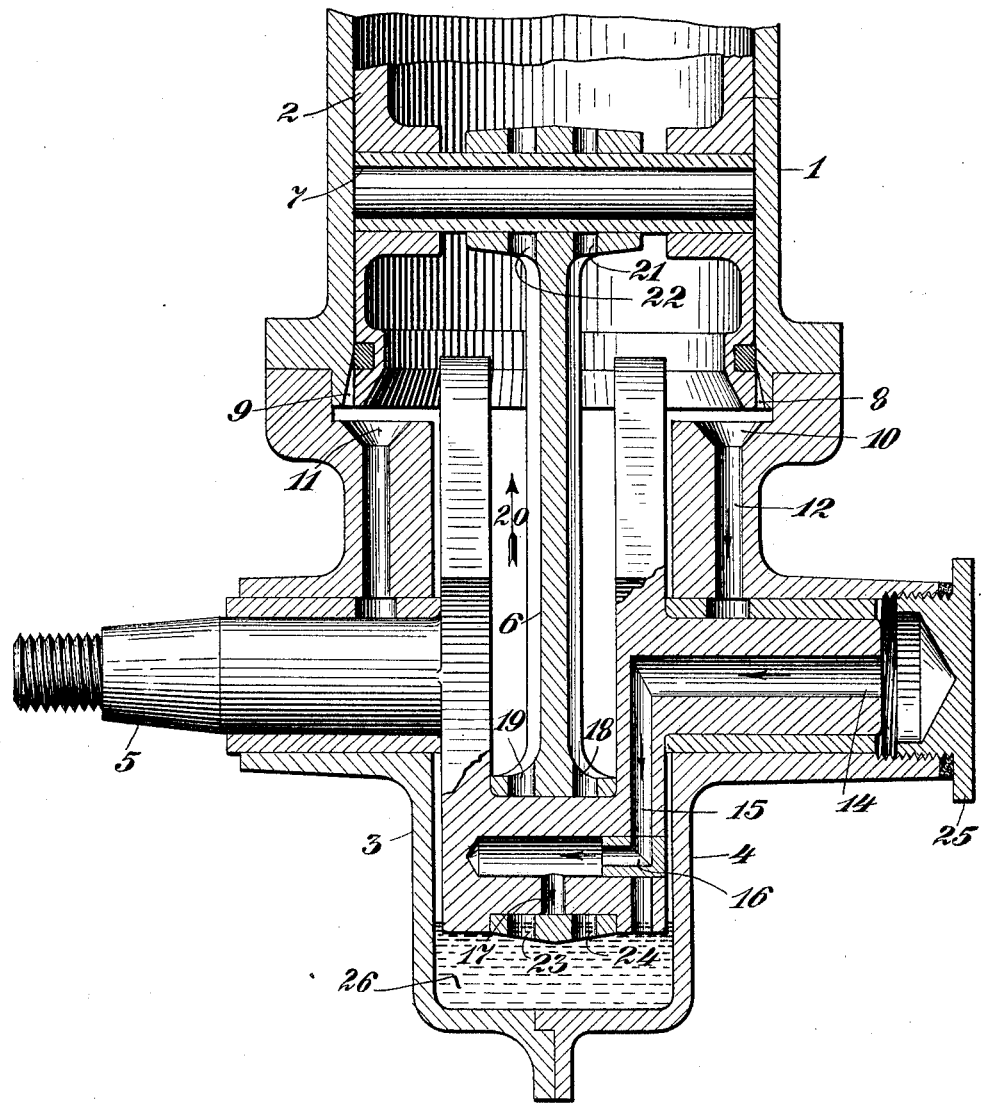

BERT L. MADDEN, OF ROCHESTER, NEW YORK, ASSIGNOR TO CYCLEMOTOR CORPORATION, OF ROCHESTER, NEW YORK, A CORPORATION OF NEW YORK.

LUBRICATING DEVICE.

1,384,536.  Specification of Letters Patent.  Patented July 12, 1921.

Application filed October 25, 1919. Serial No. 333,412.

*To all whom it may concern:*

Be it known that I, BERT L. MADDEN, a citizen of the United States, and a resident of Rochester, in the county of Monroe and State of New York, have invented a new and useful Lubricating Device, of which the following is a specification.

This invention relates to engines, more particularly to engines of the internal combustion type, and specifically to an arrangement for lubricating the crank shaft journal, connecting rod bearing and wrist pin bearing.

The principal object of this invention is the production of an arrangement and construction which will insure a proper and adequate lubrication of the crank shaft journal, connecting rod bearing, and wrist pin bearing in an engine of the internal combustion type.

Other objects and advantages will appear as the description of the invention progresses, and the novel features of the invention will be particularly pointed out in the appended claims.

In describing the invention in detail, reference is had to the accompanying drawing, wherein I have illustrated a preferred physical embodiment of my invention;

The drawing comprises a single figure and is a fragmentary sectional elevation of an engine embodying my invention.

Numeral 1 designates a cylinder in which is positioned a reciprocating piston 2 of well known and well understood construction.

Below the cylinder 2 is the crank case which is formed in two parts 3 and 4.

Positioned in the crank case is the crank 5 which in general contour is of the ordinary and well known construction.

Also positioned in the crank case is the connecting rod 6, at one end embracing the crank and at the other embracing the wrist pin 7.

All of the above described parts are of the ordinary and well known construction except in so far as they have been modified by applying my invention thereto in a manner to be hereinafter described.

If an internal combustion engine is to be used by persons of slight mechanical ability then every means must be adapted to prevent harm to the engine. It has been found that inexperienced persons, as a rule, give very little thought or care to the proper lubrication of machine parts and as a consequence they often allow parts of machinery in their care to become damaged because not properly lubricated. If an internal combustion engine is designed for high speed and low weight and is to be used by inexperienced persons then every precaution and means must be taken to insure proper lubrication of the parts. The most important points for lubrication in such an engine are the points of contact of the piston and cylinder, the wrist pin bearing of the connecting rod, the crank shaft bearing of the connecting rod, and the journal bearing of the crank shaft.

Applicant purposes to properly lubricate all of such parts by mixing lubricant with the engine fuel, so that an inexperienced person may be certain of properly lubricating all of such parts merely by mixing with each gallon of fuel a certain definite proportion of lubricant. The same result can be obtained in a four stroke type of engine by placing a quantity of lubricant in the crank case such that the revolving crank will contact therewith and splash it over all the walls of the crank case, and inside of the cylinder. In fact even when the lubricant is mixed with the engine fuel a pool of lubricant may also be placed in the crank case.

In the drawing an engine has been illustrated which may be considered to be either of the two stroke or the four stroke type. If of the two stroke type the charge will be initially compressed in the crank case and if the lubricant is mixed with the fuel then it will be found that all the walls of the crank case and parts therein together with chambers connecting therewith will have lubricant sort of condense thereon. This lubricant condensing on the inside walls of the cylinder will be scraped down by the descending piston and collecting at the points 8 and 9 will fall.

Just below the lower end of the cylinder wide mouth cavities 10 and 11 are formed in the crank case and leading from these down through the body of the crank case and through any anti-friction metal in the crank shaft bearing to the crank shaft are the ducts 12 and 13. The wide mouth cavities serve to catch the lubricant and the ducts 12 and 13 serve to lead the lubricant to the crank shaft bearing where it spreads over the bearing and lubricates it as usual.

The lubricant which passes through duct 12 and spreads over the right hand crank shaft bearing also flows down over the right hand end of the crank shaft. At this point a cavity is formed by reason of the fact that cap 25 does not entirely fill the space between the end of the crank shaft and the end of the crank case and furthermore has a depression therein. This cavity will hold the lubricant until its upper surface reaches duct 14, then it passes into duct 14, along with any other lubricant which may reach duct 14 by flowing directly over the end of the crank shaft, then passes to and through ducts 15 and 16 and then to duct 17, the end of which coincides with the connecting rod bearing so that this bearing is thoroughly lubricated.

The lubricant not only lubricates the connecting rod at the crank shaft as described but due probably to centrifugal force the lubricant emerges from ducts 18 and 19 when the connecting rod reaches the limit of its movement in the direction of the arrow 20 and is thrown forcibly against the upper end of the connecting rod and flows through ducts 21 and 22 to the bearing of the connecting rod on the wrist pin and so serves to lubricate that bearing.

Applicant does not desire to be understood as alleging that the exact reason why the desired lubrication is obtained by the construction described is thoroughly understood by him, but it is believed that the rapidly rotating offset in the crank shaft exerts in some way a centrifugal force which causes the lubricant to flow through ducts 14, 15, 16 and 17. It is believed that this effect is aided not only by ducts 18 and 19 but also by ducts 23 and 24. The lubricant which is thrown from ducts 23 and 24 apparently does no useful work except to act in some way to cause lubricant to flow through the other ducts 14, 15, 16 and 17.

If considered advisable, a pool of lubricant 26, may be employed in the crank case of a two stroke engine, to be splashed about by the crank so as to increase the amount of lubricant which will be deposited on the walls of the cylinder. In any event if the lubricant is not mixed with the fuel the desired lubrication of the parts as above described may be obtained when the lubricant is not mixed with the engine fuel solely by the use of the pool of lubricant in the crank case.

In short, applicant may obtain the desired lubrication by the construction disclosed solely by lubricant mixed with the engine fuel or by a combination of a pool of lubricant in the crank case together with lubricant mixed with the engine fuel, or solely by a pool of lubricant in the crank case. All of these in so far as applicant's construction is concerned being merely means to supply lubricant to the wide mouth cavities 10 and 11.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim is:

1. In an engine, in combination: a cylinder, a piston within said cylinder; means for depositing a lubricant on the walls of the cylinder, said lubricant when the engine is in operation working down to the bottom edges of the cylinder and the piston; a crank case beneath the cylinder formed with a cavity under the said bottom edges for receiving said lubricant; a crank shaft; a bearing for the crank shaft formed with a cavity, said crank case formed with a duct leading from said first mentioned cavity to said crank shaft whereby the lubricant is conducted to said crank shaft; a connecting rod embracing the crank and connected with the piston; said crank shaft formed with a duct from its end to the bearing surfaces between the crank shaft and the connecting rod, said second mentioned cavity allowing the lubricant to pass from the crank shaft bearing to the duct in the crank shaft and so to the bearing surfaces at the connection of the crank shaft and connecting rod.

2. In an engine, in combination: a cylinder; a piston within said cylinder; means for depositing a lubricant on the walls of the cylinder, said lubricant when the engine is in operation working down to the bottom edges of the cylinder and the piston; a crank case beneath the cylinder formed with a cavity under the said bottom edges for receiving said lubricant; a crank shaft; a bearing for the crank shaft formed with a cavity, said crank case formed with a duct leading from said first mentioned cavity to said crank shaft whereby the lubricant is conducted to said crank shaft; a connecting rod embracing the crank and connected with the piston; said crank shaft formed with a duct from its end to the bearing surfaces between the crank shaft and the connecting rod, said second mentioned cavity allowing the lubricant to pass from the crank shaft bearing to the duct in the crank shaft and so to the bearing surfaces at the connection of the crank shaft and connecting rod, and means for stimulating the flow of lubricant.

3. In an engine; in combination: a cylinder, a piston within the cylinder; means for depositing a lubricant on the walls of the cylinder; a crank shaft; a connecting rod connecting the crank shaft and piston; a bearing for the crank shaft formed with a cavity; means for conducting the said lubricant to said cavity, said crank shaft formed with a duct opening into said cavity and also opening at the bearing surfaces between the crank shaft and connecting rod whereby the said surfaces are lubricated.

BERT L. MADDEN.